(12) United States Patent
Johansson

(10) Patent No.: US 6,938,115 B2
(45) Date of Patent: Aug. 30, 2005

(54) METHOD AND COMPUTER DEVICE WITH DIFFERENT CRITICALITY

(76) Inventor: Rikard Johansson, SE-589 53, Linköping (SE)

(*) Notice: Subject to any disclaimer, the term of this patent is extended or adjusted under 35 U.S.C. 154(b) by 0 days.

(21) Appl. No.: 10/435,948

(22) Filed: May 12, 2003

(65) Prior Publication Data
US 2004/0054831 A1 Mar. 18, 2004

Related U.S. Application Data

(63) Continuation of application No. PCT/SE01/02660, filed on Nov. 30, 2001.

(30) Foreign Application Priority Data

Dec. 1, 2000 (SE) .............................................. 0004421

(51) Int. Cl.[7] .............................................. G06F 12/00
(52) U.S. Cl. ...................................... 710/200; 710/260
(58) Field of Search .............................. 710/36–38, 40, 710/48–49, 309, 200, 240, 260–262, 266, 268; 713/200; 718/107

(56) References Cited

U.S. PATENT DOCUMENTS

| | | | |
|---|---|---|---|
| 4,698,785 A | 10/1987 | Desmond et al. | |
| 5,421,006 A | 5/1995 | Jablon et al. | |
| 5,630,057 A * | 5/1997 | Hait | 713/200 |
| 5,822,511 A | 10/1998 | Kashyap et al. | |
| 5,844,986 A * | 12/1998 | Davis | 713/187 |
| 6,385,718 B1 * | 5/2002 | Crawford et al. | 712/227 |
| 6,704,802 B1 * | 3/2004 | Finch et al. | 719/315 |

* cited by examiner

Primary Examiner—Khanh Dang
(74) Attorney, Agent, or Firm—Carter, DeLuca, Farrell & Schmidt, LLP

(57) ABSTRACT

A computer system and method are provided for executing multiple software of different mission-criticality. The computer system includes at least one access control circuit to prevent access to memory assigned to software of greater mission-criticality by software of lesser mission-criticality. The access control circuit is configured to be in a first position allowing access to a first memory for purposes of data retrieval and storage when the greater mission-critical software is executing and in a second position when a lesser mission-critical software is executing, allowing access to a second memory but preventing access to the first memory. The greater mission-critical software is configured to provide control signals to the access control circuit instructing the access control circuit to maneuver to the second position, when necessary, by generating an interrupt.

21 Claims, 2 Drawing Sheets

METHOD AND COMPUTER DEVICE WITH DIFFERENT CRITICALITY

PRIORITY

The present application claims priority from PCT Application No. PCT/SE01/02660 filed on Nov. 30, 2001 claiming priority from Swedish Patent Application No. 0004421-4 filed on Dec. 1, 2000. Both applications are incorporated herein by reference.

BACKGROUND OF THE INVENTION

1. Field of the Invention

The present invention is related to computer systems, and specifically to computer systems executing software having different criticality in mission-critical applications.

2. Description of the Prior Art

Different kinds of computer systems and software are being used to an increasing extent within many different fields for performing more and more tasks. This use has also increased within fields with very high reliability requirements, such as nuclear power and avionics. The software that are required to always be operational for these possibly life and death applications to perform their tasks are generally categorized as mission-critical. As the performance of computer systems increases, so has the amount of software installed in and executed by the same computer system. Additionally, the complexity of the software has also increased. However, not all software in a computer system is equally mission-critical. In such situations, the "mission-criticality" in this description and the following claims is related to how mission-critical certain software is to the overall functioning of a system. That is, how serious are the consequences when the software does not work. Software of high mission-criticality is very important and essentially always has to work, whereas the function of software with lower mission-criticality is not as important or essential to the operation of the system. Developing software that maintains high mission-criticality is, however, very costly compared to development of software of lower mission-criticality. When there is software of different mission-criticality in a computer system, there is a risk of software of lower mission-criticality affecting software of higher mission-criticality. This implies that software of lower mission-criticality, which in a computer system is intended to cooperate with software of higher mission-criticality, also has to be developed to comply with the requirements for the higher mission-criticality, which results in large development costs for the software.

SUMMARY OF THE INVENTION

The object of the present invention is to provide a computer system of the initially mentioned kind, which enables execution of software of different mission-criticality in the same computer system with high security level, without software of lower mission-criticality having to comply with the reliability requirements for the higher mission-criticality.

According to the present invention, a processor is configured to fetch input data and store output data in a first memory located on the computer system when executing the first software. Additionally, the processor is configured to fetch input data and store output data in a second memory, also included in the computer system, when executing the second software. Consequently, the second software is prevented from affecting data stored in the first memory. The first software is configured to control which output data is transferred from the first and second memory to an input/output arrangement, thereby preventing the second software from independently changing any state outside the system. Such a system enables the introduction of high mission-critical software within computer systems containing lower mission-critical software in an economically favorable manner, since the costly qualification of low mission-critical software for use with higher mission-critical software is not required. Accordingly, the computer system according to the present invention makes it possible to handle a plurality of software of different mission-criticalities in one computer system using a single processor, without lower mission-critical software having to comply with the reliability requirements of the higher mission-critical software. This is cost efficient as well as space-saving.

In a preferred embodiment of the present invention, the device includes a means for controlling access to data in the first memory. The control means is configured to be in a first position when executing the first software, in which access to data in the first memory is enabled for the first software, and be in a second position when executing the second software, in which access to data in the first memory is disabled for the second software. In its second position, the control means prevents the second software from accessing data in the first memory and, accordingly, it is ensured that the second software cannot affect data stored in the first memory, and especially input data to or output data from the first software.

According to another preferred embodiment of the invention, the control means is also adapted to control access to other components included in the computer system, beyond just the first memory, in such a manner so that access to said components are enabled when the control means is in the first position but disabled when the control means is in the second position. This results in the second software being prevented from independently changing any state inside the device. Further advantages and advantageous features of the invention are apparent from the following description and the other dependent claims.

BRIEF DESCRIPTION OF THE DRAWINGS

These and other features, aspects, and advantages of the present invention will become better understood with regard to the following description, appended claims, and accompanying drawings wherein:

DESCRIPTION OF THE PREFERRED EMBODIMENTS

Figure 1:
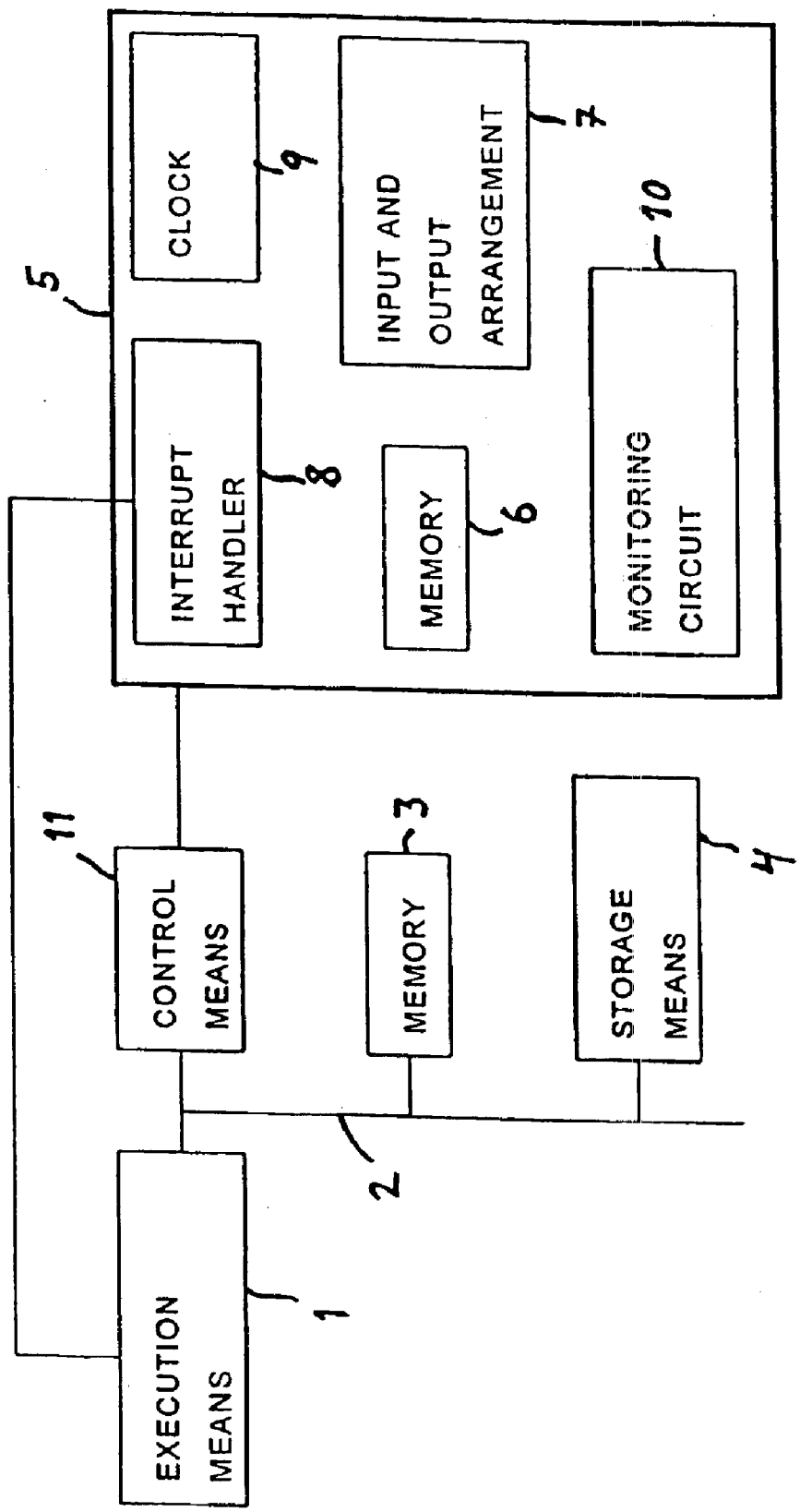
FIG. 1 is a block diagram illustrating a computer system according to a preferred embodiment of the present invention.

FIG. 1 illustrates a block diagram of the main components in a computer system according to a preferred embodiment of the present invention. The device comprises a means for executing software, preferably a processor 1, which communicates with a memory 3, preferably Random Access Memory (RAM), via a data bus 2. Also included in the device is a storage means 4, for instance a Programmable Read Only Memory (PROM), with which the processor 1 communicates via the data bus 2.

All software in the computer system is stored in the storage means 4. The software includes at least a first software of a first mission-criticality and a second software of a second mission-criticality, the first mission-criticality being higher (i.e. having a greater mission-criticality) than the second mission-criticality. The first software thus has a classification implying that errors in the function of the first software have a greater influence on the mission—the primary tasks of the computer system—compared to the influence on the mission that errors in the function of the second software have. Thus, it is more critical to the mission that the first software functions correctly than that the second software functions correctly. An illustrative example of a conceivable use of the present invention would be in an aircraft; software of higher mission-criticality may for instance be software necessary for the control system of the aircraft, whereas software of lower mission-criticality for instance may be software for providing different kinds of information, for example concerning weather conditions. It is pointed out that this is not at all meant as limiting the invention in any way, it should only be considered as an example cited for the purposes of explanation.

Furthermore, the device comprises a group 5 of hardware components, including a memory 6, preferably of a Random Access Memory (RAM), an arrangement 7 for data input to and data output from the device, an interrupt handler 8 and a clock 9. A monitoring circuit 10 may also be included in the device as shown in FIG. 1, but it is pointed out that this circuit 10 may be omitted as well. The I/O arrangement 7 may for include conventional systems for data input/output such as: keyboard, monitor, different types of sensors and switch members, etc. However, the invention is not in any way limited to the number or type of systems for data input/output depicted in the arrangement 7.

Different kinds of interrupts generated in the computer system are supplied to the processor 1 via the interrupt handler 8. These interrupts, for instance, may be caused by the I/O arrangement 7, the clock 9 and/or the monitoring circuit 10. Although only one clock 9 is illustrated in FIG. 1, it is to be understood that the number of clocks included in the device may vary. It is also to be understood that the number of monitoring circuits is optional. The different interrupts are preferably divided into Maskable Interrupts and Non-Maskable Interrupts (NMI). Each time an interrupt is generated in the computer system and supplied to the processor 1 via the interrupt handler 8, the processor 1 performs a predetermined action, which may include ignoring the interrupt in question. In this description and in the claims the term "Maskable Interrupts" relates to a type of interrupt which may be temporarily ignored by the processor 1, for instance in order to finish the task in progress, and the term "Non-Maskable Interrupts" or "interrupts of the type NMI" relates to interrupts which cannot be ignored by the processor 1 and thus have to be attended to immediately or in the near future.

The computer system is configured to fetch input data stored in the memory 6 and store output data in the memory 6 when executing the first software, and fetch input data stored in the memory 3 and store output data in the memory 3 when executing the second software. In this manner, output data from the second software is prevented from affecting input data to or output data from the first software.

The first software is adapted to control which output data is transferred from the memory 6 and the memory 3 to the I/O arrangement 7, thereby preventing the second software from independently changing any state outside the device. For example, this is achieved by having the first software check the output data generated by the second software, which is to be transferred from the memory 3 to the I/O arrangement 7.

Furthermore, the computer system comprises at least one logic circuit 11, for controlling access to data in the memory 6. The logic circuit 11 is configured to be in a first position when executing the first software, so that access to data in the first memory 6 is enabled for the first software, and in a second position when executing the second software, so that access to data in the first memory 6 is disabled for the second software. This implies that the processor 1 is allowed to read, write and delete data in the memory 6 when executing the first software, but is not allowed to read, write or delete data in the memory 6 when executing the second software, thereby ensuring that output data from the second software actually cannot affect data stored in the memory 6 and thus cannot affect input data to or output data from the first software.

In the embodiment according to the present invention illustrated in FIG. 1, the logic circuit 11 is also adapted to control access to other components included in the computer system besides just the memory 6, for instance the components included in the group 5: the I/O arrangement 7, the clock 9 and the monitoring circuit 10, in such a manner that access to said components is enabled when the logic circuit 11 is in the first position but disabled when the logic circuit 11 is in the second position. Thus, the processor 1 does not have access to these components when executing the second software, and, therefore, is prevented-from changing any state inside the computer system while executing the second software. It is to be understood that the previously mentioned components, to which the logic circuit 11 controls access, include every component found in the computer system that is capable of affecting the stable mission-critical operation of the device in any way. Consequently, the logic circuit 11 may control access to more or less components than illustrated in FIG. 1 depending on the actual implementation and function.

Preferably, the logic circuit 11 is adapted to be maneuverable into its first position by means of an interrupt generated in the computer system, preferably of the type NMI, and maneuverable into its second position by means of the first software. Accordingly, the logic circuit 11 is maneuverable into the first position by the processor 1 with the generation of an interrupt, preferably of the type NMI, via the interrupt handler 8 to the processor 1 and maneuverable into the second position by the processor 1 when executing the first software. Furthermore, the first software is preferably adapted to be activateable by an interrupt, preferably of the type NMI, generated in the computer system.

As mentioned hereinabove, the interrupts in the preferred embodiment of the present invention, by which the logic circuit 11 is maneuverable into its first position and by which the first software is adapted to be activateable, are preferably of the type NMI. This is, however, by no means any limitation of the invention, it is only one possible preferred embodiment. It is emphasized that other interrupts may be utilized for achieving the maneuvering of the logic circuit and activation of the first software. If other interrupts, instead of those of the type NMI, are used, it must be ensure that the first and second software do not use instructions which can disable the interrupts, and, thereby, obstruct activation of the first software and maneuvering of the logic circuit. Furthermore, in this case it has to be ensured that upon interrupt generation, that is meant to maneuver the logic circuit into its first position, execution of the first software is started immediately in order to eliminate the possibilities of the second software getting access to the components to which the logic circuit controls access, since the first software maneuvers the logic circuit into its second position before execution of the second software is started.

The preferred use of interrupts of the type NMI is further advantageous from a stability point of view, as they ensure that activation of the first software always will take place irrespective of what the processor 1 is doing or has done when such an interrupt occurs, since the processor 1 cannot ignore such an interrupt. Thus, the processor 1 will always execute the first software when an interrupt of the type NMI is generated in the computer system and supplied to the processor 1 from the interrupt handler 8. Accordingly, it is possible to prevent the computer system from being put in a state, which it is incapable of changing, i.e. that the computer system "freezes" in an infinite loop or corresponding state. For example, this may be prevented by having the first software cause the clock 9 to generate an interrupt of the type NMI if a certain number of time steps elapse without any events occurring.

Furthermore, the second software is adapted to be activateable by means of the first software, which implies that the first software is able to instruct the processor 1 to start execution of the second software.

Below follows a description of the function of a computer system according to the present invention.

The computer system is started and the usual start-up and built-in tests are performed. During these built-in tests, the function of the logic circuit 11 is tested. At this start, the logic circuit 11 is in the first-position, but after the built-in tests, it is brought to the second position and the first software waits in an infinite loop. When an interrupt, preferably of the type NMI, is generated in the computer system, the logic circuit 11 is maneuvered into the first position and execution of the first software is started, input data to the first software is read into the memory 6 from the I/O arrangement 7 first. Subsequently, input data is fetched from the memory 6 and output data is stored in the memory 6 during the execution. Input data required for execution of the second software is read into the memory 3 from the I/O arrangement 7, followed by the logic circuit 11 being maneuvered into the second position and the second software is activated by the first software, thus the first software makes sure that execution of the second software is started. At the execution of the second software, input data is fetched from the memory 3 and output data is stored in the memory 3. At the next generation of an interrupt, preferably of the type NMI, which causes the logic circuit 11 to maneuver into the first position, output data is transferred from the memory 6 and the memory 3 to the I/O arrangement 7, with the first software controlling which output data is transferred and thereby preventing the second software from independently changing any state outside the device. This control may, for instance, include the first software checking output data generated by the second software, which is to be transferred from the memory 3 to the I/O arrangement 7. Subsequently, the logic circuit 11 is maneuvered into the second position by the first software and a new interrupt, preferably a NMI, is waited for, at which the execution method described above is repeated.

In this way it is efficiently and with high reliability ensured that at execution of the second software, output data therefrom cannot affect either input data to or output data from the first software and it is also ensured that the second software cannot independently change any state outside the device.

Figure 2:
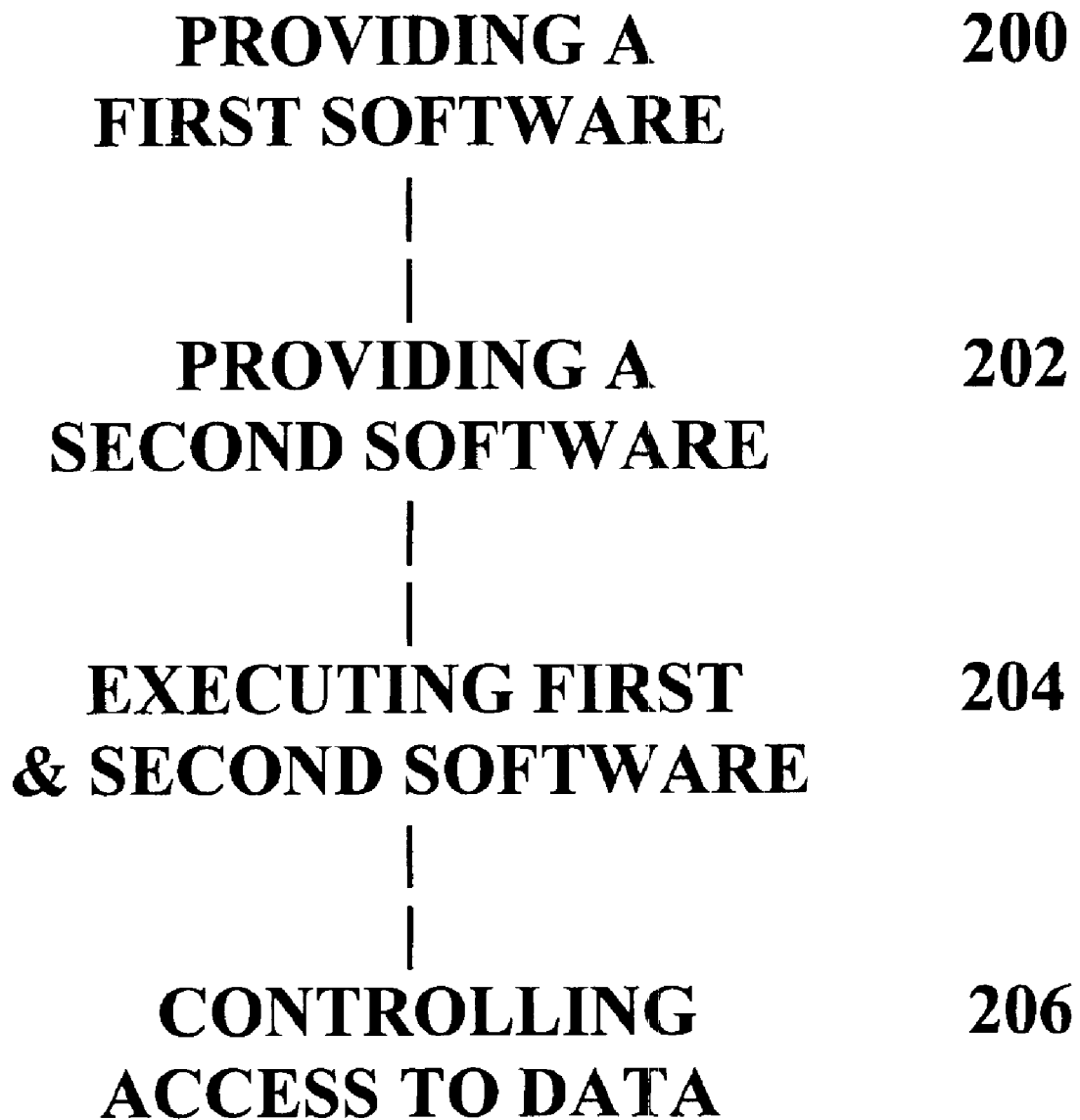
FIG. 2 is a flowchart illustrating a method according to the preferred embodiment of the present invention.

With reference to FIG. 2, a method for executing software of different mission-criticality according to the present invention includes the steps of providing a first software (Step 200): providing a second software having a lower mission-criticality than said first software (Step 202): and executing the first software and the second so are (Step 204). In step 204, when executing the first software, input data is fetched from a first memory and output data is stored to the first memory and when executing the second software, input data is fetched from a second memory and output data is stored to the second memory. The second software is prevented from affecting data stored in the first memory. The first software controls which output data is transferred from the first memory and the second memory to a data input/output arrangement thereby preventing output, via said input/output arrangement, of data from the second software which has not been checked by the first software.

The method further includes the step of controlling access to the data (Step 206), performed by at least one logic circuit, wherein the at least one logic circuit is darted to be in a first position when executing the first software so that access to data in the firs memory is enabled for the first software, and in a second position when executing the second software so that access to data in the first memory is disabled for the second software. The at least one logic circuit is adapted to be maneuverable into its second position by execution of e first software. The first software is activated by means of an interrupt generated in the computer system and configured to activate the second software. The interrupt is a Non-Maskable Interrupt (NMI).

The invention is not in any way limited to the embodiments described above, but many possible modifications thereof will be apparent to a person of ordinary skill in the art without departing from the basic idea of the invention.

It is emphasized that although only one first software of a first mission-criticality and one second software of a second mission-criticality, which is lower than the first mission-criticality, have been described in the preferred embodiments above, it is to be understood that of course an optional number of software may exist. For example, a usual use of the present invention will probably include one software of a first mission-criticality and a plurality of second software of another mission-criticality, which for each of the plurality of second software is lower than the first mission-criticality.

What is claimed is:

1. A computer system comprising:

a storage means for storing at least a first software having a first mission-criticality and a second software having a second mission-criticality, wherein said first mission-criticality is greater than the second mission-criticality, an input/output arrangement for providing data input output functionality; and means for executing the first and second software using a single processor, wherein said means for executing is connected to said storage means and said input/output arrangement, such that when executing said first software, input data is fetched from a first memory connected to said storage means and output data is stored to said first memory and when executing said second software, input data is fetched from a second memory connected to said storage means and output data is stored to said second memory, whereas said second software is prevented from affecting data stored in the first memory, and wherein said first software controls which output data is transferred from the first memory and the second memory to said data input/output arrangement thereby preventing output, via said input/output arrangement, of data from said second software which has not been checked by said first software.

2. A computer system according to claim 1, further comprising an access control means connected to the means for executing for controlling access to data in the first memory, whereas said access control means is adapted to be in a first position when executing the first software so that access to data in the first memory is enabled for the first software, and in a second position when executing the second software so that access to data in the first memory is disabled for the second software.

3. A computer system according to claim 2, wherein said access control means is further adapted to control access to other computer system components included in the computer system in a manner that access to said components is enabled when said access control means is in the first position but disabled when said access control means is in the second position.

4. A computer system according to claim 2, wherein said access control means is further adapted to be maneuverable into its first position by means of an interrupt generated in the computer system.

5. A computer system according to claim 4, wherein said interrupt is a Non-Maskable Interrupt (NMI).

6. A computer system according to claim 2, wherein said access control means is adapted to be maneuverable into its second position by means of the first software.

7. A computer system according to claim 2, wherein said access control means comprises at least one logic circuit.

8. A computer system according to claim 1, wherein said first software is adapted to be activateable by means of an interrupt generated in the computer system.

9. A computer system according to claim 8, wherein said interrupt a Non-Maskable Interrupt (NMI).

10. A computer system according to claim 1, wherein said second software is adapted to be activateable by means of the first software.

11. A computer system according to claim 1, wherein said first memory is a Random Access Memory (RAM).

12. A computer system according claim 1, wherein said second memory is a Random Access Memory (RAM).

13. A computer system according to claim 1, wherein said storage means is a Programmable Read Only Memory (PROM).

14. A method for executing software of different mission-criticality, comprising the steps of:
providing a first software;
providing a second software having a lower mission-criticality than said first software; and
executing said first software and said second software by a single processor, wherein when executing said first software, input data is fetched from a first memory and output data is stored to said first memory and when executing said second software, input data is fetched from a second memory and output data is stored to said second memory, wherein said second software is prevented from affecting data stored in the first memory, and wherein said first software controls which output data is transferred from the first memory and the second memory to a data input/output arrangement thereby preventing output, via said input/output arrangement, of data from said second software which has not been checked by said first software.

15. A method according to claim 14, further comprising the step of controlling access to said data, performed by at least one logic circuit, wherein said at least one logic circuit is adapted to be in a first position when executing said first software so that access to data in said first memory is enabled for said first software, and in a second position when executing said second software so that access to data in said first memory is disabled for said second software.

16. A method according to claim 15, wherein said at least one logic circuit is adapted to be maneuverable into its second position by execution of the first software, said first software being activateable by means of an interrupt generated in the computer system and configured to activate said second software.

17. A method according to claim 16, wherein said interrupt is a Non-Maskable Interrupt (NML).

18. A computer system comprising:
a storage means for storing at least a first software having a first mission-criticality and a second software having a second mission-criticality, wherein said first mission-criticality is greater than said second mission-criticality;
an input/output arrangement for providing data input and output functionality;
means for executing the first and second software using a single processor, wherein said means for executing is connected to said storage means and said input/output arrangement, wherein when executing said first software, input data is fetched from a first memory an output data is stored to said first memory and when executing said second software, input data is fetched from a second memory and output data is stored to said second memory, wherein said second software is prevented from affecting data stored in the first memory, and wherein said first software controls which output data is transferred from the first memory and the second memory to said input/output arrangement thereby preventing output, via said input/output arrangement, of data from said second software which has not been checked by said first software; and
an access control means for controlling access to data in the first memory, wherein said access control means is connected to said means for executing and adapted to be in a first position when executing the first software so that access to data in the first memory is enabled for the first software, and in second position when executing the second software so that access to data in the first memory is disabled for the second software.

19. A computer system according to claim 18, wherein said access control means is further adapted to control access to other computer system components included in the computer wherein access to said components is enabled when said access control means is in the first position and disabled when said access control means is in the second position.

20. A computer system according to claim 18, wherein said access control means is further adapted to be maneuverable into its first position by means of an interrupt generated in the computer system, said interrupt is a Non-Maskable interrupt (NMI).

21. A computer system according to claim 18, wherein said access control means is comprised of at least one logic circuit adapted to be maneuverable into its second position by execution of the first software, said first software being activateable by means of an interrupt generated in the computer system and configured to activate said second software.

* * * * *